United States Patent
Engelhardt et al.

(10) Patent No.: US 11,754,847 B2
(45) Date of Patent: Sep. 12, 2023

(54) METHOD OF AND APPARATUS FOR FORMING AND SHIFTING A LIGHT INTENSITY DISTRIBUTION IN A FOCAL AREA OF AN OBJECTIVE LENS

(71) Applicant: Max-Planck-Gesellschaft zur Foerderung der Wissenschaften e.V., Munich (DE)

(72) Inventors: Johann Engelhardt, Bad Schoenborn (DE); Stefan W. Hell, Goettingen (DE)

(73) Assignee: MAX-PLANCK-GESELLSCHAFT ZUR FÖRDERUNG DER WISSENSCHAFTEN E.V., Munich (DE)

( * ) Notice: Subject to any disclaimer, the term of this patent is extended or adjusted under 35 U.S.C. 154(b) by 399 days.

(21) Appl. No.: 17/209,516

(22) Filed: Mar. 23, 2021

(65) Prior Publication Data

US 2021/0208411 A1    Jul. 8, 2021

Related U.S. Application Data

(63) Continuation-in-part of application No. PCT/EP2018/076248, filed on Sep. 27, 2018.

(51) Int. Cl.
*G01N 21/64* (2006.01)
*G02B 21/06* (2006.01)
(Continued)

(52) U.S. Cl.
CPC ..... *G02B 27/0927* (2013.01); *G01N 21/6402* (2013.01); *G01N 21/6458* (2013.01);
(Continued)

(58) Field of Classification Search
None
See application file for complete search history.

(56) References Cited

U.S. PATENT DOCUMENTS 5,604,344 A * 2/1997 Finarov ............. G02B 21/245
250/201.3
6,376,818 B1 * 4/2002 Wilson ............. G02B 21/0044
250/201.3
(Continued)

FOREIGN PATENT DOCUMENTS

DE    102012020877 A1    4/2014
WO    2013072273 A1    5/2013
(Continued)

OTHER PUBLICATIONS

André Klauss et al.: Binary phase masks for easy system alignment and basic aberration sensing with patial light modulators in STED microscopy, Scientific Reports, vol. 7, No. 1, Nov. 16, 2017 (Nov. 16, 2017), XP055588222, DOI: 10.1038/s41598-017-15967-5.
(Continued)

*Primary Examiner* — David P Porta
*Assistant Examiner* — Djura Malevic
(74) *Attorney, Agent, or Firm* — Thomas | Horstemeyer, LLP

(57) ABSTRACT

For forming and shifting a light intensity distribution in a focal area of an objective lens, portions of coherent input light are one by one directed into non-identical two-dimensional pupil areas of a pupil of the objective lens. Each of the portions of coherent input light is collimated in the pupil. The pupil areas include a pair of two pupil areas which are axially symmetrically arranged on opposite sides of an optical axis of the objective lens. At least one of the two discrete portions of coherent input light that are directed into the pair of pupil areas is separately modulated with regard to its phase by means of an electro optical modulator such as to form the light intensity distribution in the focal area with a local intensity minimum delimited by intensity maxima (Continued)

and to shift the local intensity minimum laterally with regard to the optical axis.

21 Claims, 7 Drawing Sheets

(51) Int. Cl.
  *G02B 21/16* (2006.01)
  *G02B 27/10* (2006.01)
  *G02B 27/09* (2006.01)
  *G02F 1/035* (2006.01)
(52) U.S. Cl.
  CPC ............ *G02B 21/06* (2013.01); *G02B 21/16* (2013.01); *G02B 27/0994* (2013.01); *G02B 27/106* (2013.01); *G02F 1/035* (2013.01); *G02F 2203/50* (2013.01)

(56) References Cited

U.S. PATENT DOCUMENTS

| | | | | |
|---|---|---|---|---|
| 7,488,924 | B2* | 2/2009 | Bublitz | G02B 21/244 |
| | | | | 250/201.3 |
| 8,084,754 | B2* | 12/2011 | Hell | G02B 21/16 |
| | | | | 250/459.1 |
| 8,174,692 | B2* | 5/2012 | Hell | G01N 21/6428 |
| | | | | 356/317 |
| 8,585,587 | B2* | 11/2013 | French | A61B 5/0071 |
| | | | | 600/181 |
| 9,121,788 | B2* | 9/2015 | Zhu | G02B 19/0095 |
| 9,285,593 | B1 | 3/2016 | Laskin et al. | |
| 9,297,744 | B2* | 3/2016 | Zeng | G01N 21/23 |
| 9,568,724 | B2* | 2/2017 | Westphal | G02B 21/082 |
| 9,891,417 | B2* | 2/2018 | Hell | G01N 21/6458 |
| 10,274,715 | B2* | 4/2019 | Kuhn | G02B 21/365 |
| 10,663,749 | B2* | 5/2020 | Schwedt | G02B 26/0816 |
| 10,795,140 | B2* | 10/2020 | Schoenle | H04N 23/56 |
| 11,555,991 | B2* | 1/2023 | Siebenmorgen | G02B 27/0012 |
| 11,598,941 | B2* | 3/2023 | Netz | G02B 21/0056 |
| 2003/0132394 | A1* | 7/2003 | Wolleschensky | G01N 21/6458 |
| | | | | 250/458.1 |
| 2006/0186311 | A1* | 8/2006 | Backs | G02B 21/0004 |
| | | | | 250/201.3 |
| 2007/0102620 | A1* | 5/2007 | Bublitz | G02B 21/245 |
| | | | | 250/201.3 |
| 2007/0268583 | A1 | 11/2007 | Dyba | |
| 2009/0303474 | A1 | 12/2009 | Dyba | |
| 2010/0033811 | A1* | 2/2010 | Westphal | G02B 7/36 |
| | | | | 359/368 |
| 2010/0294749 | A1* | 11/2010 | Kempe | G02B 21/245 |
| | | | | 219/121.75 |
| 2011/0134308 | A1* | 6/2011 | Arnz | G02B 21/245 |
| | | | | 348/E5.045 |
| 2014/0042340 | A1 | 2/2014 | Hell | |
| 2014/0097358 | A1* | 4/2014 | Hell | G02B 21/16 |
| | | | | 250/578.1 |
| 2014/0347665 | A1* | 11/2014 | Zeng | G01N 21/23 |
| | | | | 356/364 |
| 2015/0116807 | A1 | 4/2015 | Anhut et al. | |
| 2015/0248015 | A1* | 9/2015 | Schwedt | G02B 21/0032 |
| | | | | 359/371 |
| 2016/0305884 | A1 | 6/2016 | Hell | |
| 2017/0082844 | A1 | 3/2017 | Hell et al. | |
| 2017/0126990 | A1* | 5/2017 | Han | G01J 3/2823 |
| 2019/0011367 | A1 | 1/2019 | Hell et al. | |
| 2019/0234879 | A1 | 8/2019 | Balzarotti et al. | |
| 2019/0234882 | A1 | 8/2019 | Balzarotti et al. | |
| 2019/0235220 | A1 | 8/2019 | Balzarotti et al. | |
| 2021/0356800 | A1* | 11/2021 | Fan | G02F 1/1337 |
| 2022/0381619 | A1* | 12/2022 | Pan | G01J 9/02 |
| 2023/0160684 | A1* | 5/2023 | Feng | G01B 9/02075 |
| | | | | 356/450 |

FOREIGN PATENT DOCUMENTS

| | | |
|---|---|---|
| WO | 2015052186 A1 | 4/2015 |
| WO | 2015097000 A1 | 7/2015 |
| WO | 2017153430 A1 | 9/2017 |
| WO | 2018069283 A1 | 4/2018 |

OTHER PUBLICATIONS

International Search Report in co-pending related PCT Application No. PCT/EP2018/076248, dated May 27, 2019.
EP Communication relating to third party observations, dated Oct. 0, 2022.

* cited by examiner

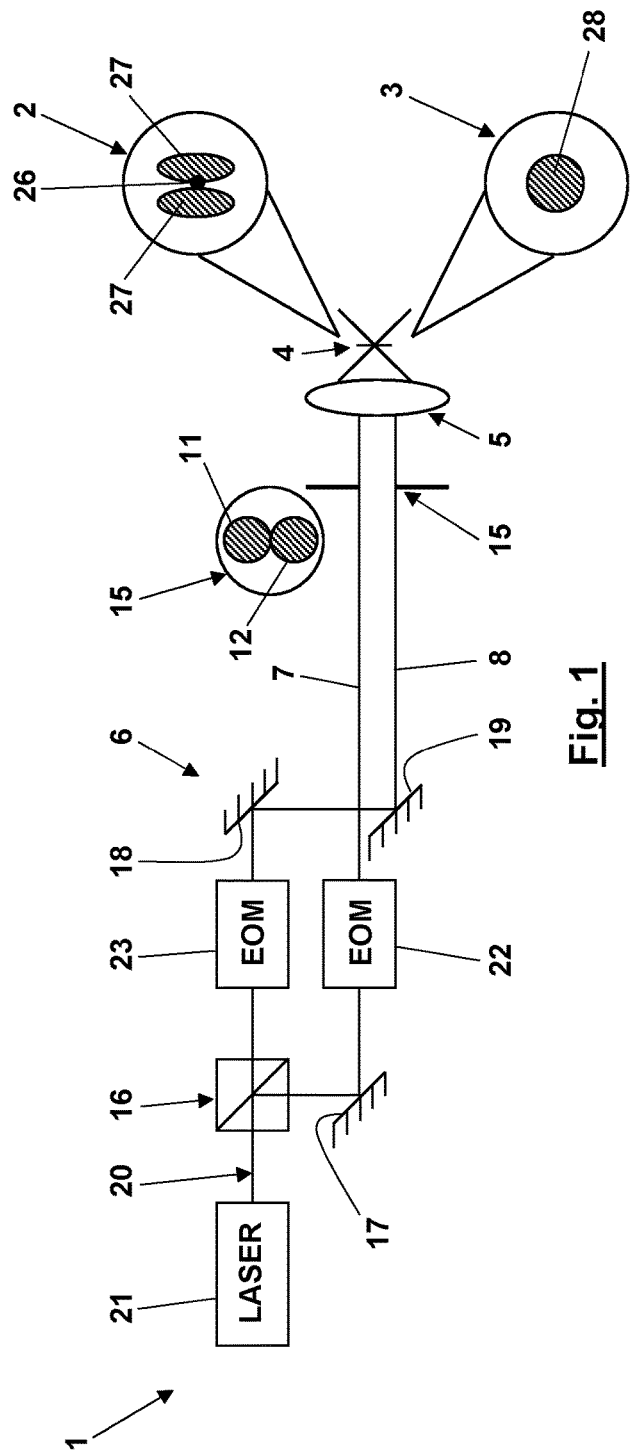
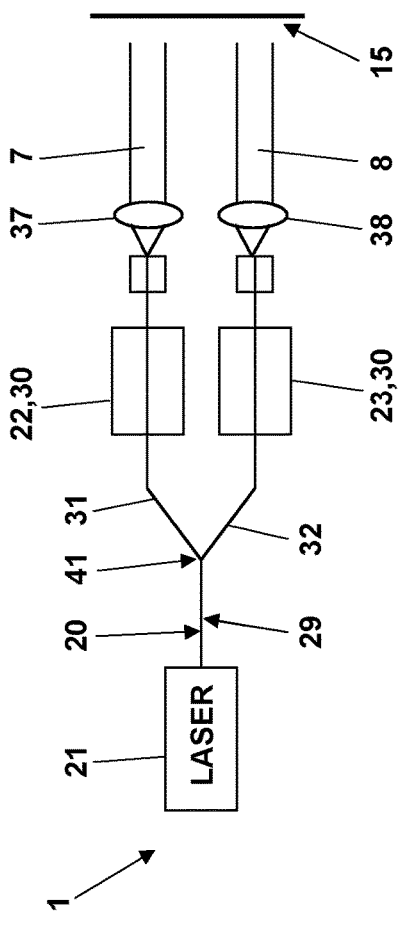
Fig. 1
Fig. 2

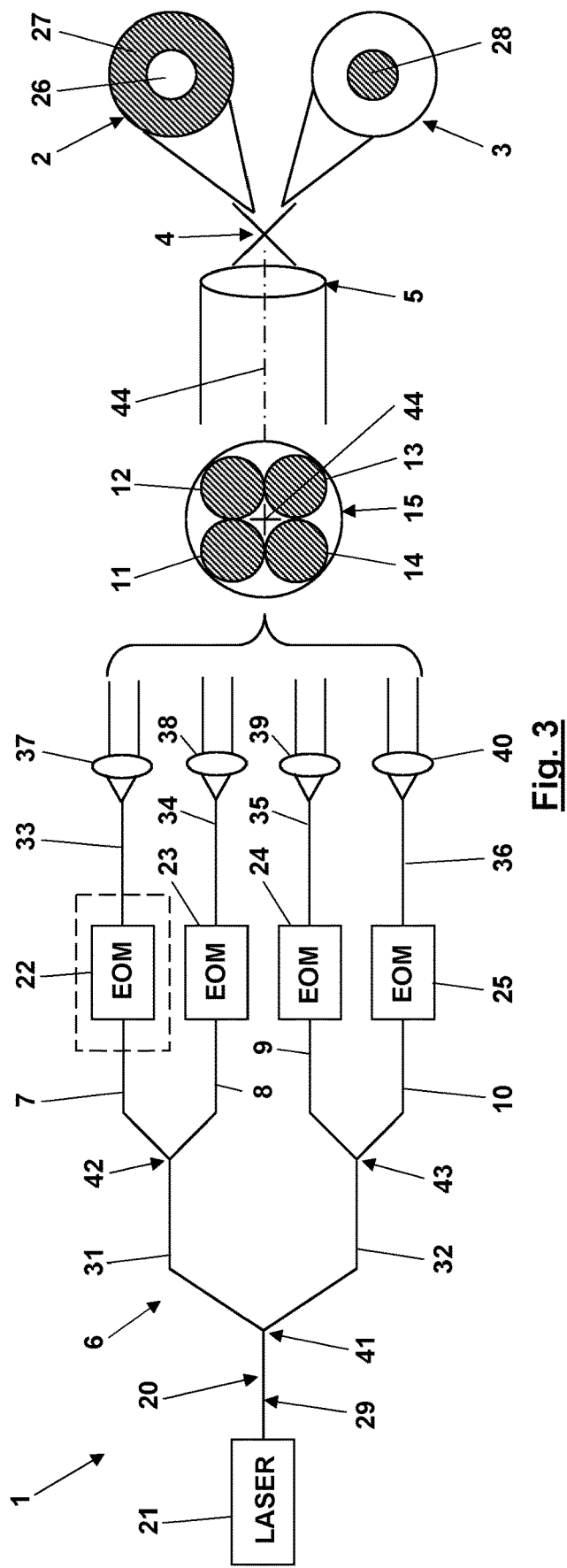
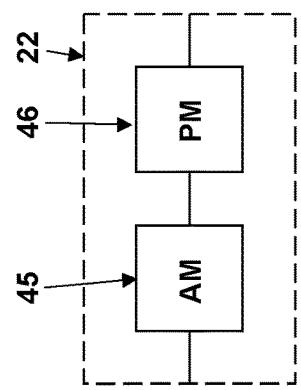
Fig. 3
Fig. 4

METHOD OF AND APPARATUS FOR FORMING AND SHIFTING A LIGHT INTENSITY DISTRIBUTION IN A FOCAL AREA OF AN OBJECTIVE LENS

CROSS REFERENCE TO RELATED APPLICATIONS

The present application is a continuation in part to international application PCT/EP2018/076248 filed on Sep. 27, 2018 and entitled "Method of and Apparatus for Forming and Shifting a Light Intensity Distribution in a Focal Area of an Objective Lens".

FIELD OF THE INVENTION

The present invention relates to a method of and an apparatus for forming and shifting a light intensity distribution in a focal area of an objective lens. Further, the present invention relates to a microscope comprising such an apparatus and an objective lens.

BACKGROUND OF THE INVENTION

In STED fluorescence microscopy, in addition to fluorescence excitation light focused into an intensity maximum, fluorescence inhibition light is directed into a sample to be examined. An intensity distribution of the fluorescence inhibition light comprises an intensity minimum or zero point coinciding with the intensity maximum of the fluorescence excitation light and surrounded by intensity maxima. In the areas of these intensity maxima, the emission of fluorescence light by fluorescence markers included in the sample is inhibited by the fluorescence inhibition light. Thus, fluorescence light detected may only origin out of the minimum of the intensity distribution of the fluorescence inhibition light. This corresponds to a strong increase in spatial resolution of measuring the sample as compared to common laser-scanning-microscopy.

A known method of forming the intensity distribution of the fluorescence inhibition light comprising the intensity minimum enclosed by intensity maxima is to deform or modulate plane wavefronts of incoming coherent fluorescence inhibition light such that, when the fluorescence inhibition light is focused into a same focal area as the fluorescence excitation light, the desired intensity distribution is formed as an interference pattern. One known suitable modulation of the plane wavefronts is a phase difference between a center part of a pupil of an objective focusing the fluorescence inhibition light and an outer ring part of this pupil of $\pi$ or $\lambda/2$, i.e. of half the wavelength of the fluorescence inhibition light. This phase modulation results in two strong maxima of the fluorescence inhibition light on both sides of the central intensity minimum along the optical axis of the objective and a weaker ring-shaped maximum enclosing the minimum within the focal plane of the objective. Another known phase modulation is a so-called phase clock according to which a phase difference is introduced which, over a circle around the center of the pupil of the objective focusing the fluorescence inhibition light, increases from zero to $2\pi$ or $\lambda$, i.e. the wavelength of the fluorescence inhibition light. The intensity distribution of the fluorescence inhibition light resulting from the phase clock is a donut extending along the focal plane and enclosing a zero point of the intensity of the fluorescence inhibition light within the focal plane of the objective.

It is also known to discretize the phase clock in that the phase of the fluorescence inhibition light is constantly delayed over pie segments of the pupil of the objective. Already with three pie segments of equal size the phase clock can be approximated such that a central intensity minimum is enclosed by intensity maxima in all directions within the focal plane of the objective. The approximation of the phase clock gets better with more pie segments, and with six pie segments of equal size the phase clock is already approximated quite well.

In order to implement a discretized phase clock, the wavefronts of the fluorescence inhibition light may be modulated using a segmented phase plate. If the wavefronts of the fluorescence inhibition light are modulated using a spatial light modulator, the modulation pattern may also be varied to, for example, compensate for aberrations of an optical system, adapt the pattern to the pupil of the objective and tune the pattern to reduce both the intensity of the fluorescence inhibition light in the minimum of its intensity distribution and the spatial dimensions of this minimum.

Similar light intensity distributions as they are suitable for the fluorescence inhibition light in STED fluorescence microscopy are, for example, used in MINFLUX microscopy, see WO 2018/069283 A1, and other microscopic methods, see, for example, WO 2015/097000 A1, WO 2015/052186 A1 and WO 2013/072273 A1. In these methods, the intensity distribution comprising the central intensity minimum or zero point enclosed by intensity maxima is an intensity distribution of fluorescence excitation light used without fluorescence inhibition light.

At least some of the methods referenced above would benefit from or even require that the central intensity minimum of the fluorescence inhibition light can be shifted with regard to the sample at both a high velocity and a high precision. With regard to STED fluorescence microscopy, this particularly applies to a method called Minfield STED, see WO 2017/153430 A1. The standard means for shifting a light intensity distribution with regard to a sample in scanning fluorescence microscopy is a scanner consisting of rotating or tilting mirrors which are rotated or tilted by electric drives like piezo-electric drives or galvanometric drives, i.e. so-called piezos or galvos. The velocities achieved in shifting a light intensity distribution using these drives is low when compared to the accuracy achieved. This is due to the fact that the mass of the respective mirror has to be moved in changing directions.

WO 2017/153430 A1 not only discloses the use of galvo mirrors but also of electro-optical scanners and acousto-optical deflectors for scanning smaller partial areas of a sample with a light intensity distribution. Further, this document states that a device for scanning partial areas of the sample may be combined with an additional electro-optical or acousto-optical modulator as a phase shifter for shifting the zero point of the light intensity distribution of luminescence inhibition light. No details, however, are given with regard to how one electro-optical modulator may be used as a phase shifter.

It is known that a spatial light modulator may be used to shift a position of a zero point of a light intensity distribution of fluorescence inhibition light within a partial area of a sample. The modulation pattern of a spatial light modulator, however, cannot be changed at a high frequency. In US 2015/0116807 A1, temporal focal modulation technique (FFM) is described which is a method used in fluorescence microscopy in order to be able to switch rapidly between different focusing fields. FFM is based on the rapid switching of the optical phase in the pupil of an objective lens.

Particularly, the phase is shifted in two half pupils. The switching between two focusing states, one having a zero point on the optical axis, the other having no zero point, is made by operating an electro-optical modulator (EOM) arranged in front of a birefringent phase plate. The birefringent phase plate either splits the pupil of the objective lens into two half pupils with a phase offset of λ/2 or is not active at another polarization of the input light transmitted through the EOM and thus not splitting the pupil into two different halves. US 2015/0116807 A1 further discloses a microscope in which at least one illuminating beam, in a partial area along the cross-section thereof, is phase-modulated with a modulation frequency. A microscope objective is provided for focusing the illumination beam into a sample. In the illumination beam path upstream of the microscope objective, a first polarization beam splitter is provided which generates at least first and second partial beam paths. A second polarization beam splitter is provided for rejoining the partial beams. In one of the two partial beam paths, a phase element is provided which has at least two areas causing different phase shifts. The phase element may be a spatial light modulator (SLM). Acousto-optical modulators (AOMs) may be arranged in both partial beam paths to quickly switch them on and off.

U.S. Pat. No. 9,285,593 discloses a beam shaping method and apparatus in which a phase shift function is introduced in a beam of input light. The phase shift function is introduced by a phase transforming optical system implemented in form of a plate or a telescope or at a collimator or integrated into the focusing optical system. The phase transforming optical system includes an aspheric optical surface providing the phase shift function with smooth phase transition. Any diffraction-limited optics with positive dioptric power may be applied as the focusing optical system.

DE 10 2012 020 877 A1 and US 2015/248 015 A1 belonging to the same patent family disclose an optical assembly for positioning in a beam path of a light microscope having means for providing structured illuminating light in a sample plane of the light microscope, so that structured illuminating light can be generated in different orientations. The optical assembly has an adjustable deflector in order to deflect an incident light bundle onto one of several beam paths in a selectable manner. Beam splitting devices are located in the beam paths in order to split the light bundle of the respective beam paths into partial light bundles, which are spatially separated to from each other. Beam guides are provided for each of the partial light bundles, and guide the partial light bundles to a pupil plane. The beam guides are arranged in such a way that the partial light bundles that belong to the same beam path form a light spot pattern in the pupil plane; and that the light spot patterns of different beam paths in the pupil plane are different from each other. A phase relationship between the partial light beams of the same beam path can be controlled by means of an electrical effect. To this end, the light conducting paths of the beam guides have manipulation regions, in which a refractive index is voltage dependent. Electro-optic modulators, which define the refractive index in the adjacent region by means of an adjustable voltage, are present adjacent to the manipulation regions. The refractive indices in the manipulation regions are varied by means of the electro-optic modulators for the purpose of phase shifting a structured illumination that is generated by means of one of the light spot patterns. The phase relationship can be controlled very quickly by means of the electro-optic modulators.

There still is a need of a method of and an apparatus for forming and shifting a light intensity distribution in a focal area of an objective lens which allow both for a very high velocity and a very high precision in shifting the formed light intensity distribution. Further, the method and the apparatus shall be quickly adaptable to multiple wavelengths.

SUMMARY OF THE INVENTION

The present invention relates to a method of forming and shifting a light intensity distribution in a focal area of an objective lens. The method comprises directing a plurality of portions of coherent input light one by one into a plurality of non-identical two-dimensional pupil areas of a pupil of the objective lens. Each of the plurality of portions of coherent input light is collimated in the pupil of the objective lens, and the plurality of non-identical two-dimensional pupil areas include at least one pair of two two-dimensional pupil areas which are axially symmetrically arranged on opposite sides of an optical axis of the objective lens. The method further comprises separately modulating at least one of the two discrete portions of coherent input light that are directed into the two two-dimensional pupil areas of the at least one pair with regard to its phase by means of an electro optical modulator such as to form the light intensity distribution in the focal area of the objective lens with a local intensity minimum delimited by intensity maxima and to shift the local intensity minimum in the focal area laterally with regard to the optical axis of the objective lens.

The present invention also relates to an apparatus for forming and shifting a light intensity distribution in a focal area of an objective lens. The apparatus comprises optics configured for directing a plurality of portions of coherent input light one by one into a plurality of non-identical two-dimensional pupil areas of a pupil of the objective lens. Each of the plurality of portions of coherent input light is collimated in the pupil of the objective lens, and the plurality of non-identical two-dimensional pupil areas includes at least one pair of two two-dimensional pupil areas which are axially symmetrically arranged on opposite sides of an optical axis of the objective lens. The apparatus further comprises a modulator equipment including at least one electro optical modulator comprising a phase modulator configured and arranged for separately modulating at least one of the two discrete portions of coherent input light that are directed into the two two-dimensional pupil areas of the at least one pair with regard to its phase such as to form the light intensity distribution in the focal area of the objective lens with a local intensity minimum delimited by intensity maxima and to shift the local intensity minimum in the focal area laterally with regard to the optical axis of the objective lens.

The present invention also relates to a microscope comprising an objective lens, an apparatus according to the present invention, a detector configured and arranged for detecting photons emitted out of the focal area, and a register configured for registering an associated position of the local intensity minimum in the focal area for each photon detected.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components of the drawings are not necessarily to scale, emphasize instead being placed upon clearly illustrating the principles of the present invention. In the drawings, like reference numerals designate corresponding parts throughout the several views.

FIG. 1 schematically depicts a first embodiment of an apparatus for forming and shifting a light intensity distribution in a focal area of an objective lens.

FIG. 2 schematically depicts a variant with regard to parts of the embodiment of the apparatus according to FIG. 1.

FIG. 3 schematically depicts a second embodiment of the apparatus for forming and shifting a light intensity distribution in a focal area of an objective lens.

FIG. 4 schematically depicts an electro optical modulator used in the apparatus for forming and shifting a light intensity distribution in a focal area of an objective lens.

DETAILED DESCRIPTION

Figure 5:
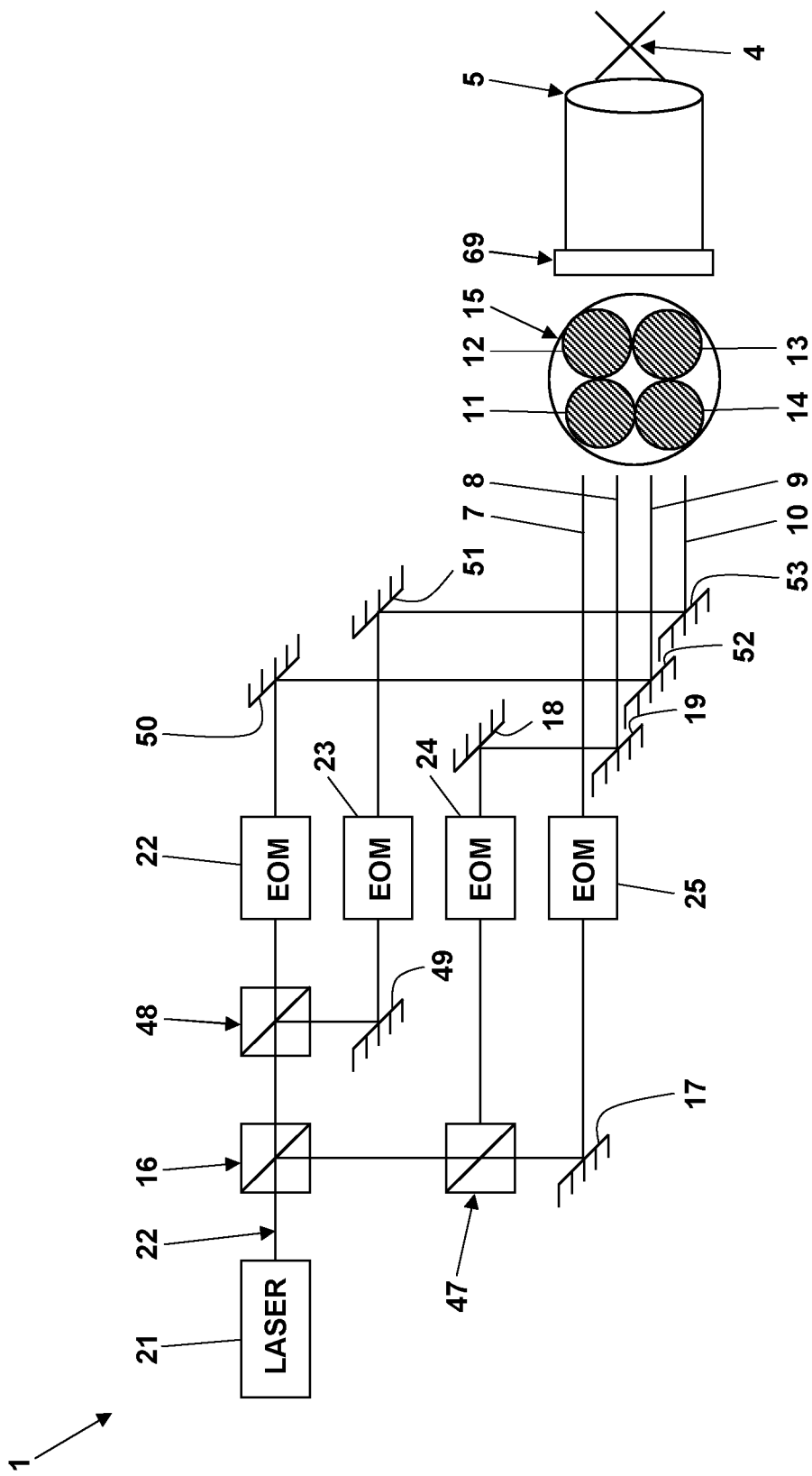
FIG. 5 schematically depicts a further embodiment of the apparatus for forming and shifting a light intensity distribution in a focal area of an objective lens.

The method of forming and shifting a light intensity distribution in a focal area of an objective lens comprises directing a plurality of discrete portions of coherent input light into a plurality of non-identical two-dimensional pupil areas of a pupil of the objective lens, and separately modulating at least one portion of the plurality of portions of coherent input light at least with regard to its phase, i.e. with regard to its phase or with regard to its phase and its amplitude, by means of separate electro optical modulator.

The non-identical two-dimensional pupil areas have substantial two-dimensional dimensions within the pupil of the objective lens. Typically, with n non-identical two-dimensional pupil areas, each of the non-identical two-dimensional pupil areas will cover at least 25/n % of the total area of the pupil. Often, each of the non-identical two-dimensional pupil areas will cover at least about 50/n % of the total area of the pupil.

In an embodiment of the method, the electro optical modulator is a separate electro optical modulator which is by-passed by other portions of the plurality of portions of coherent input light. Then, the at least one portion of the plurality of portions of coherent input light is not modulated with regard to its phase or its amplitude by means of any modulator through which all other portions of the plurality of portions of coherent input light pass as well.

In any case, the at least one discrete portion of the plurality of portions of coherent input light is not modulated by an area of a spatial light modulator comprising other areas reflecting or transmitting the other portions of the plurality of portions of coherent input light.

Instead, a separate electro optical modulator is provided for the at least one discrete portion of the plurality of portions of coherent input light. Such an electro optical modulator may be controlled at a very high frequency as it has no moving parts of a relevant physical mass. Further, the electro optical modulator may be controlled at a high precision with regard to the at least one of the phase and the amplitude of the at least one discrete portion of the plurality of portions of coherent input light. Both a modulation of the phase and the amplitude of the at least one discrete portion of the plurality of portions of coherent input light may be used to shift the light intensity distribution formed as an interference pattern of the focused portions of the plurality of portions of coherent input light in the focal area of the objective lens. The phase of the at least one portion will determine where in the focal area a positive or negative interference with the other portions of the plurality of portions of coherent input light will occur. The amplitude of the at least one portion will determine to which extent the respective positive or negative interference will occur at the respective location in the focal area.

That the two-dimensional pupil areas of the pupils of the objective lens into which the discrete portions of coherent input light are directed are non-identical at least means that they are not all extending over a same area of the pupil. Preferably, the non-identical pupil areas are essentially non-overlapping or even not overlapping at all. Then, each discrete portion of the plurality of portions of coherent input light is directed into a pupil area not overlapping with any pupil area of another one of the discrete portions of coherent input light.

In the following discussion of the preferred embodiment of the method, the term "portion of the plurality of portions of coherent input light" will sometimes be abbreviated by "portion". Similarly, "two-dimensional pupil areas of the plurality of non-identical two-dimensional pupil areas of the pupil of the objective lens" will sometimes be abbreviated by "two-dimensional pupil areas, or even as "pupil areas". Other similar abbreviations will be made as well.

In some embodiments of the method, the electro optical modulator used for separately modulating the at least one portion of coherent input light is by-passed by all other portions of the plurality of portions of coherent input light to ensure that the electro optical modulator only modulates the at least one portion of coherent input light.

Further, at least two, preferably at least three and sometimes at least four discrete portions of the plurality of portions of coherent input light may be differently separately modulated by means of at least two or at least three or at least four individual electro optical modulators. Each further electro optical modulator allows for differently modulating a further one of the discrete portion of coherent input light. Thus, each further electro optical modulator increases the variability in forming and shifting the light intensity distribution in the focal area of the objective.

The at least two or at least three or at least four discrete portions of the plurality of portions of coherent input light may be separately modulated by means of the at least two or at least three or at least four individual electro optical modulators. Each of the at least two or at least three or at least four individual electro optical modulators may be by-passed by all other discrete portions of the plurality of portions of coherent input light to ensure that the respective electro-optical modulator only modulates the respective one of the discrete portions. This makes controlling the modulation much easier than with electro-optical modulators through which more than one of the discrete portions of coherent input light is passed and may, thus, be modulated as well.

Preferably, at least a half of all discrete portions of coherent input light are separately modulated by means of individual electro-optical modulators. In some embodiments of the method, all of the discrete portions of the plurality of portions of coherent input light are separately modulated by means of individual electro-optical modulators. This means that there are as many individual electro-optical modulators as discrete portions of coherent input light.

The separate electro optical modulators may be integrated optical light modulators integrated into optical fibers each guiding one discrete portion of the plurality of portions of coherent input light. Such integrated optical light modulators are commercially available and may be used for implementing the present invention.

When each discrete portion of the plurality of portions of coherent input light is guided by one fiber of a plurality of optical fibers, the coherent input light getting out of the ends of these fibers may be collimated and projected into the plurality of non-identical pupil areas. The plurality of portions of coherent input light are then guided by a bundle of optical fibers, and each fiber directly corresponds to one of the non-identical pupil areas.

If the input light directly comes from a laser, it is already collimated.

In the method, a beam of coherent input light may be split up to provide the discrete portions of the plurality of portions of coherent input light. This splitting up may be implemented by any suitable beam splitter.

In the method, a fraction of each discrete portion of the plurality portions of coherent input light may be coupled out and projected onto a monitoring camera for monitoring the positions of the individual discrete portions of the plurality of portions of coherent input light in the pupil of the objective lens. In addition to their phases and amplitudes, the positions of the discrete portions of coherent input light in the pupil of the objective lens will determine the shape and the position of the light intensity distribution in the focal area of the objective lens. Thus, for forming and shifting the light intensity distribution in a controlled way by modulating at least one of the phases and amplitudes, it is mandatory to keep the positions of the individual discrete portions in the pupil of the objective lens constant. To achieve this purpose, the positions have to be monitored.

The pupil areas of the plurality of non-identical pupil areas may be uniformly distributed around an optical axis of the objective lens. Then, the modulation of the at least one of the phases and amplitudes of the discrete portions will form or alter and shift the light intensity distribution in the focal area of the objective lens in a most predictive way.

With pupil areas uniformly distributed around the optical axis of the objective lens, the discrete portions of coherent input light may be provided with basic phase offsets. These basic phase offsets may be implemented by a control offset in controlling the respective electro optical modulators or by different optical path lengths, wave plates or the like.

With n pupil areas of the plurality of pupil areas, the basic offset between two discrete portions of coherent input light directed into two neighboring pupil areas of the plurality of non-identical pupil areas may, for example, be 360°/n or 720°/n. In this case, the basic phase offsets provide for a phase clock and thus for a central intensity minimum surrounded by a donut-shaped intensity maximum of the light intensity distribution in the focal area of the objective lens. By modulating the at least one of the phases and amplitudes of the discrete portions, the position of the central intensity minimum may be laterally shifted with regard to the optical axis. If the phase offset between the two discrete portions of coherent input light directed into the two neighboring pupil areas of the plurality of pupil areas is 0° or m×360°, m being an integer, the intensity distribution will have a central intensity maximum, which may be shifted by modulating the at least one of the phases or the amplitudes of the discrete portions of coherent input light.

Particularly, the plurality of pupil areas will include at least one pair of pupil areas, which are axially symmetrically arranged on opposite sides of the optical axis of the objective lens, and at least one of the two discrete portions of coherent input light directed into the two pupil areas of the at least one pair of pupil areas is separately modulated by means the electro optical modulator. By means of this modulation, the intensity pattern formed of the two discrete portions of coherent input light of the respective pair is shifted in the direction of their distance across the optical axis. A phase offset between the two discrete portions of coherent input light directed into the two pupil areas of each of the pairs of pupils areas may be (2m+1)×180° or m×360° m×360°, m being an integer.

In the method, the modulation of the at least one portion of the plurality of portions of coherent input light with regard to at least one of its phase and its amplitude by means of the separate electro optical modulator may either be static during a certain process, like a measurement process, or it may be varied or changed during such a process.

For example, the discrete portions of coherent input light may be alternately separately modulated by means of the separate electro optical modulators such as to alternately provide for first basic phase offsets and second basic phase offsets between the discrete portions of coherent input light, the first basic offsets differing from the second basic offsets. Thus, two different light intensity distribution may be provided alternately, one having a central intensity minimum and one having a central intensity maximum, for example. As the modulation of the discrete portions of coherent input light by means of the separate electro optical modulators may be altered very fast, it is possible to change between the different intensity distributions very fast.

Particularly, the plurality of the discrete portions of coherent input light may alternately be provided with a first wavelength and with a second wavelength of the coherent input light, the second wavelength differing from the first wavelength, and the discrete portions of coherent input light may be separately modulated by means of the individual electro optical modulators differently with the first wavelength and with the second wavelength of the coherent input light. Thus, for example, directly successive pulses of fluorescence excitation light and of fluorescence inhibition light may be formed into different intensity distributions in the focal area of the objective lens.

Further, the discrete portions of coherent input light may separately be modulated by means of the individual electro optical modulators to compensate for aberrations of the plurality of portions of coherent input light caused by the objective lens or any other optics through which the discrete portions of coherent input light pass on their way to the focal area. Thus, any astigmatism caused by these optics may be compensated for by simply slightly altering the modulation of the discrete portions of coherent input light by means of the separate electro optical modulators.

In one embodiment of the method, the light intensity distribution in the focal area of the objective is formed such as to display a local intensity minimum enclosed by intensity maxima, wherein at least two discrete portions of the plurality of portions of coherent input light are modulated such as to move the intensity minimum like, for example, along a circle around the optical axis of the objective lens. This embodiment of the method may particularly be used to implement a variant of MINFLUX microscopy in that photons emitted by a single fluorophore molecule located in the focal area are detected, wherein for each photon detected an associated position of the local intensity minimum in the focal area is registered, and wherein an average position of the registered position is calculated and taken as the position of the single fluorophore molecule in the focal area. This variant of MINFLUX microscopy in which the local intensity minimum of the light intensity distribution is moved along a circle and wherein photons emitted by a single fluorophore molecule located in the focal area are detected, wherein for each photon detected an associated position of the local intensity minimum in the focal area is registered and wherein an average position of the registered positions, is calculated and taken as the position of the single fluorophore molecule in the focal area is also to be regarded as an invention by its own, independently on how the light intensity distribution comprising the local intensity minimum is formed and shifted. Further, in this variant of MINFLUX microscopy the light intensity distribution in the focal area of the objective displaying the local intensity minimum enclosed by intensity maxima may either be an intensity distribution of fluorescence or luminescence excitation light as in usual MINFLUX microscopy, or an intensity distribution of fluorescence or luminescence inhibition light, optionally combined with a central maximum of fluorescence or luminescence excitation light.

In the method, the light intensity distribution may be superimposed with at least one further light intensity distribution of light incoherent with regard to the coherent input light of the light intensity distribution. This further light intensity distribution may have the same effect or function as the light intensity distribution. For example, both the light intensity distribution and the further light intensity distribution may either consist of fluorescence excitation or fluorescence inhibition light. Then, typically both the light intensity distribution and the further light intensity distribution will have a central local intensity minimum and these two local intensity minima will coincide. The light intensity distribution may enclose its local intensity minimum by a donut in a focal plane of the objective, whereas the light intensity distribution may enclose its light intensity minimum by two strong light intensity maxima spaced apart along the optical axis and a weaker ring around the optical axis.

With same functions of the light intensity distribution and the further light intensity distribution, the non-coherency serves for avoiding an unwanted interference between the two light intensity distributions.

As an alternative, the further light intensity distribution may have another effect or function than the light intensity distribution. For example, the further light intensity distribution may consist of fluorescence excitation light, whereas the light intensity distribution consists of fluorescence inhibition light. Then, the further light intensity distribution may have a central intensity maximum coinciding with a central intensity minimum of the light intensity distribution.

In any case, the further light intensity distribution may be a static light intensity distribution which is not shifted when shifting the light intensity distribution, because the further light intensity distribution has no structure over that distance over which the light intensity distribution is shifted at maximum in the focal area of the objective lens.

The apparatus for forming and shifting a light intensity distribution in a focal area of an objective lens comprises optics for directing a plurality of portions of coherent input light into a plurality of non-identical pupil areas of a pupil of the objective lens, and a modulator equipment for modulating at least one portion of the plurality of portions of coherent input light with regard to its phase, or its phase and its amplitude. The modulator equipment includes at least one separate or individual electro optical modulator for separately modulating one discrete portion of the plurality of portions of coherent input light. This electro optical modulator may be bypassed by others of the portions of the plurality of portions of coherent input light. Here, the fact that the pupil areas into which the optics direct the portions of coherent input light are "non-identical" has the same meaning as in the context of the method described above.

The individual or separate electro optical modulator may be arranged for being bypassed by all other portions of the plurality of portions of coherent input light. Further, the modulator equipment may include at least two or at least three or at least four individual electro optical modulators, which are configured and arranged for differently separately modulating at least two or at least three or at least four discrete portions of the plurality of portions of coherent input light.

These at least two or at least three or at least four separate electro optical modulators may be configured and arranged for separately modulating the at least two or at least three or at least four discrete portions of the plurality of portions of coherent input light in that each of the at least two or at least three or at least four separate electro optical modulators is bypassed by all other portions of the plurality of portions of coherent input light.

Preferably, the modulator equipment includes one individual electro optical modulator for each discrete portion of the plurality of portions of coherent input light, although the apparatus will already achieve a good performance with the modulator equipment including one individual electro optical modulator per each pair of portions of the plurality of portions of coherent input light as the relative phase and amplitude of the two discrete portions of coherent input light of each pair of portions will be decisive.

In an embodiment of the apparatus, the individual electro optical modulators are integrated optical light modulators integrated into optical fibers each configured for guiding one portion of the plurality of portions of coherent input light. As already mentioned above, such integrated optical light modulators are commercially available. These commercially available integrated optical light modulators can be used in the apparatus without modification.

In the apparatus, each fiber of a plurality of optical fibers may be used to guide one discrete portion of the plurality of portions of the coherent input light. Then, a projection optic can be used to collimate the coherent input light getting out of the ends of the fibers of the plurality of optical fibers and to project its discrete portions into the pupil of the objective lens.

The individual electro optical modulators employed in the apparatus may particularly be selected from Pockels-cells and Kerr-cells. Generally, any other known type of electro optical modulator may also be used, particularly if it may be operated both quickly and precisely with regard to the modulation of at least the phase and optionally also of the amplitude of the light modulated.

The apparatus may comprise a beam splitting device configured and arranged for splitting a beam of coherent light to provide the discrete portions of coherent input light. The beam splitting to device may include at least one polarizing or non-polarizing beam splitter made as a cube or plate. A polarizing beam splitter may be combined with wave plates for adjusting the relative intensities and the polarizations of the discrete portions of coherent input light. The beam splitting device may also include at least one birefringent beam splitter other than a polarizing beam splitter or a birefringent beam displacer. This at least one birefringent beam splitter may, for example, be a Wollaston prism. Further, the beam splitting device may include at least one fiber optical beam splitter. The beam splitting device and also the optics directing the plurality of portions of coherent input light into the pupil of the objective lens may additionally include at least one birefringent device like, for example, a beam displacer for adjusting lateral distances between the discrete portions of coherent input light to lateral distances between the electro optical modulators and/or lateral distances between the non-identical pupil areas of the pupil of the objective lens.

In one embodiment of the apparatus, a monolithic optical unit includes the beam splitting device, the modulator equipment and at least one part of the optics. In this monolithic optical unit, all relevant parts of the beam splitting device and the modulator equipment and the at least one part of the optics are fixed with regard to each other. With such a monolithic unit, adjusting the apparatus and keeping a proper adjustment of the apparatus becomes much easier than with individual optical elements that are all moveable with regard to each other.

The apparatus may comprise a monitoring equipment including a monitoring camera and configured and arranged for coupling out and projecting a fraction of each discrete portion of the plurality of portions of coherent input light onto the monitoring camera for monitoring the positions of the individual discrete portions in the pupil of the objective lens. The pictures of the monitoring camera may be evaluated automatically and used for readjusting the positions of the individual discrete portions in the pupil of the objective lens, if necessary.

Particularly, the optics of the apparatus may be configured for directing the portions of the plurality of portions of coherent input light into the pupil areas such that the portions are uniformly distributed around the optical axis of the objective lens. With n non-identical pupil areas, a basic phase offset between two discrete portions of coherent input light directed into two neighboring pupils areas may then be 360°/n or 720°/n or 0°.

The apparatus may comprise a controller controlling the separate electro optical modulators. The controller may control the individual electro optical modulators such as to alternately separately modulate the discrete portions of coherent input light to alternately provide for first basic phase offsets and for second basic phase offsets between the discrete portions of coherent input light, the first basic offsets differing from the second basic offsets.

In one embodiment, the apparatus comprises a light source alternately providing the plurality of the discrete portions of coherent input light with a first wavelength and with a second wavelength of the coherent input light, the second wavelength differing from the first wavelength. Then the controller may control the separate electro optical modulators to separately modulate the discrete portions of coherent input light differently with the first wavelength and with the second wavelength of the coherent input light.

Further, the apparatus may comprise a controller controlling the individual electro optical modulators to further separately modulate the discrete portions of coherent input light to compensate for aberrations of the plurality of portions of coherent input light caused by the objective lens or any other optic.

The respective controller of the apparatus may particularly comprise a data storage and control the separate electro optical modulators to separately modulate the discrete portions of coherent input light based on predetermined control data stored in the data storage. The predetermined control data allow for very quickly change the modulation of the discrete portions of coherent input light by means of altering the control of the separate electro optical modulators. by means of the controller.

In one embodiment of the apparatus, the optics are configured for directing the plurality of portions of coherent input light into the plurality of non-identical pupil areas, the plurality of non-identical pupil areas including pairs of pupil areas which are axially symmetrically arranged on opposite sides of the optical axis of the objective lens. Then, the modulator equipment will include individual electro optical modulators arranged for separately modulating at least one of two discrete portions of the plurality of portions of coherent input light, which are directed into the two pupil areas of each of the pairs of pupil areas.

The microscope comprises an objective lens, an apparatus for forming and shifting a light intensity distribution in a focal area of the objective lens as described above, a detector configured and arranged for detecting photons emitted by a fluorophore molecule located in the focal area, and a register configured for registering an associated position of the local intensity minimum in the focal area for each photon detected. This microscope may be used to implement the method which has been described above and which is to be regarded as an invention by its own.

All the afore mentioned phase and amplitude settings of the portions of the coherent input light may be set and changed very fast to accommodate multiple wavelengths. For this purpose calibrated control values may be stored in a controller of the apparatus or microscope for very fast switching between different wavelengths of the coherent input light.

Now referring in greater detail to the drawings, the apparatus 1 depicted in FIG. 1 is provided for forming and shifting a light intensity distribution 2, 3 in a focal area 4 of an objective lens 5. FIG. 1 shows the two light intensity distributions 2 and 3 which may alternatively be formed and shifted by the apparatus 1 in a front view at an enlarged scale. The apparatus 1 comprises optics 6 for directing discrete portions 7 and 8 of coherent input light into non-identical two-dimensional pupil areas 11 and 12 of a pupil 15 of the objective lens 5, which is additionally depicted in FIG. 1 in a front view at an enlarged scale. The optics include a 50/50 beam splitter 16 and three full mirrors 17 to 19 here. The 50/50 beam splitter 16 splits a beam 20 of collimated coherent light 20 emitted by a laser 21 into the two discrete portions 7 and 8 of collimated coherent input light, and it separates the beam paths of the discrete portions 7 and 8. Individual electro optical modulators (EOMs) 22 and 23 are arranged in the beam paths of the discrete portions 7 and 8 for separately modulating the discrete portions 7 and 8 at least with regard to their respective phase and optionally also with regard to their respective amplitude. By means of this modulation, the light intensity distributions 2 and 3 can both be formed and shifted in the focal area 4. Particularly, the light intensity distribution 2 is formed, if the discrete portions 7 and 8 display a basic phase offset of 180° so that the light intensity distribution 2 displays a local intensity minimum 26 in its center which is delimited by two intensity maxima 27 in one lateral direction. The light intensity distribution 3 displaying a central intensity maximum 28 is formed with a basic phase offset between the two discrete portions 7 and 8 of 0° or 360°. By varying the phase offset and the relative amplitudes of the discrete portions 7 and 8, the light intensity distributions 2 and 3 may be shifted laterally within the focal area 4.

FIG. 2 shows another embodiment of the apparatus 1 for forming and shifting a light intensity distribution in a focal area of an objective lens but only depicts those parts of the apparatus 1 from the laser 21 to the pupil 15. Here, the coherent beam 20 is coupled into an optical fiber 29 and split up into the discrete portions 7 and 8 by means of a fiber optical beam splitter 41. The electro optical modulators 22 and 23 are integrated electro optical modulators 30 integrated in optical fibers 31 and 32 guiding the discrete portions 7 and 8. The discrete portions 7 and 8 emerging out of the optical fibers 31 and 32 are collimated and projected into the pupil 15 by means of microlenses 37 and 38.

FIG. 3 shows an embodiment of the apparatus 1 in which the optics 6, similar to FIG. 2, are fiber optics. The fiber optics of FIG. 3, besides the fiber optical beam splitter 41, include two further fiber optical beams splitters 42 and 43 so that four discrete portions 7 to 10 of coherent input light are guided by four optical fibers 33 to 36. One electro optical modulator 22 to 25 is integrated in each of the four optical fibers 33 to 36. The four discrete portions 7 to 10 of the coherent input light emerging out of the optical fibers 33 to 36 are collimated by four microlenses 37 to 40, and they are then directed into four non-identical pupil areas 11 to 14 of the pupil 15, which are uniformly distributed around the optical axis 44 of the objective lens 5. With a phase offset between the discrete portions 7 to 10 directed into directly neighboring pupil areas 11 to 14 of 90° and a phase offset between the discrete portions 7 to 10 directed into pupil areas 11 to 14 on opposite sides of the optical axis 44 of 180°, the light intensity distribution 2 is formed that displays a central intensity minimum 26 enclosed by a donut-shaped intensity minimum 27 in the focal plane of the objective lens 5. With a zero phase offset of the discrete portions 7 to 10 of 0°, the light intensity distribution 3 with the central intensity maximum 28 is formed. Both light intensity distributions 2 and 3 may be shifted in both lateral directions by means of modulating the phases and/or amplitudes of the discrete portions 7 to 10 with the electro optical modulators 22 to 25.

FIG. 4 schematically shows one electro optical modulator 22 as including an amplitude modulator 45 and a phase modulator 46. In some embodiments of the apparatus 1 for forming and shifting a light intensity distribution in a focal area of an objective lens, the electro optical modulators 22 to 25 will only include the phase modulator 46. In some other embodiments some of the electro optical modulators 22 to 25 may only include the amplitude modulator 45.

FIG. 5 shows a further embodiment of the apparatus 1 for forming and shifting a light intensity distribution in a focal area of an objective lens. Similar to that one of FIG. 1, this embodiment is based on 50/50 beam splitters 16, 48 and 48 and full mirrors 17 to 19 and 49 to 53. The embodiment of the apparatus 1 of FIG. 5, however, provides four discrete portions 7 to 10 of coherent input light in four non-overlapping pupil areas 11 to 14 of the pupil 15 of the objective lens 5. Thus, the embodiment of the apparatus 1 according to FIG. 5 may provide the same light intensity distributions as that one according to FIG. 3.

Figure 6:
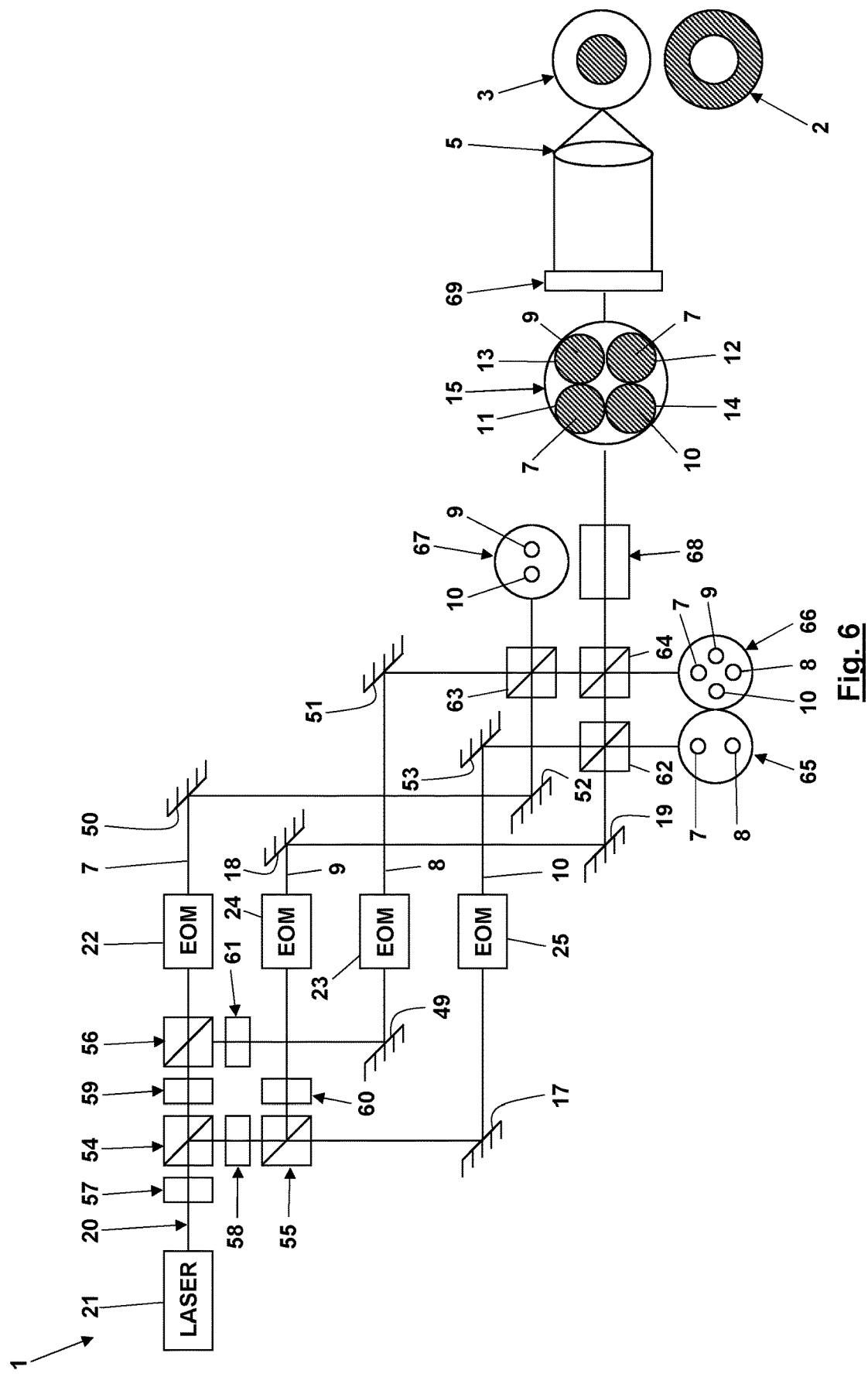
FIG. 6 depicts a further embodiment of the apparatus for forming and shifting a light intensity distribution in a focal area of an objective lens additionally comprising monitoring equipment.

This also applies to the embodiment of the apparatus 1 depicted in FIG. 6. Here, the 50/50 beam splitters 16, 47 and 48 according to FIG. 5 are replaced by polarization beam splitters 54 to 56. These beam splitters are combined with λ/2 waveplates 57 to 61 which may be rotated about their optical axes for defining the relative amplitudes of the discrete portions 7 to 10 of coherent input light modulated by the electro optical modulators 22 to 25. By means of the mirrors 17 to 19 and 50 to 53 plus additional 50/50 beam splitters 62 to 64, the discrete portions 7 and 8 are recombined to be directed into the pupil 15 of the objective lens 5 and to also couple out and project fractions of each discrete portion 7 to 10 onto three monitoring cameras 65 to 67 for monitoring the positions of the individual discrete portions 7 to 10 in the pupil 15 of the objective lens 5. For this purpose, the cameras 65 to 67 are arranged in planes conjugated to the pupil 15. Further, the embodiment of the apparatus 1 according to FIG. 6 includes an adjustable polarizer 68 and a λ/4 waveplate 69 at the entrance of the objective lens 5 to provide for optimum polarizations of the discrete portions 7 to 10 which are needed for forming the desired light intensity distributions 2 and 3 depending on the relative phase offsets of the discrete portions 7 to 10.

Figure 7:
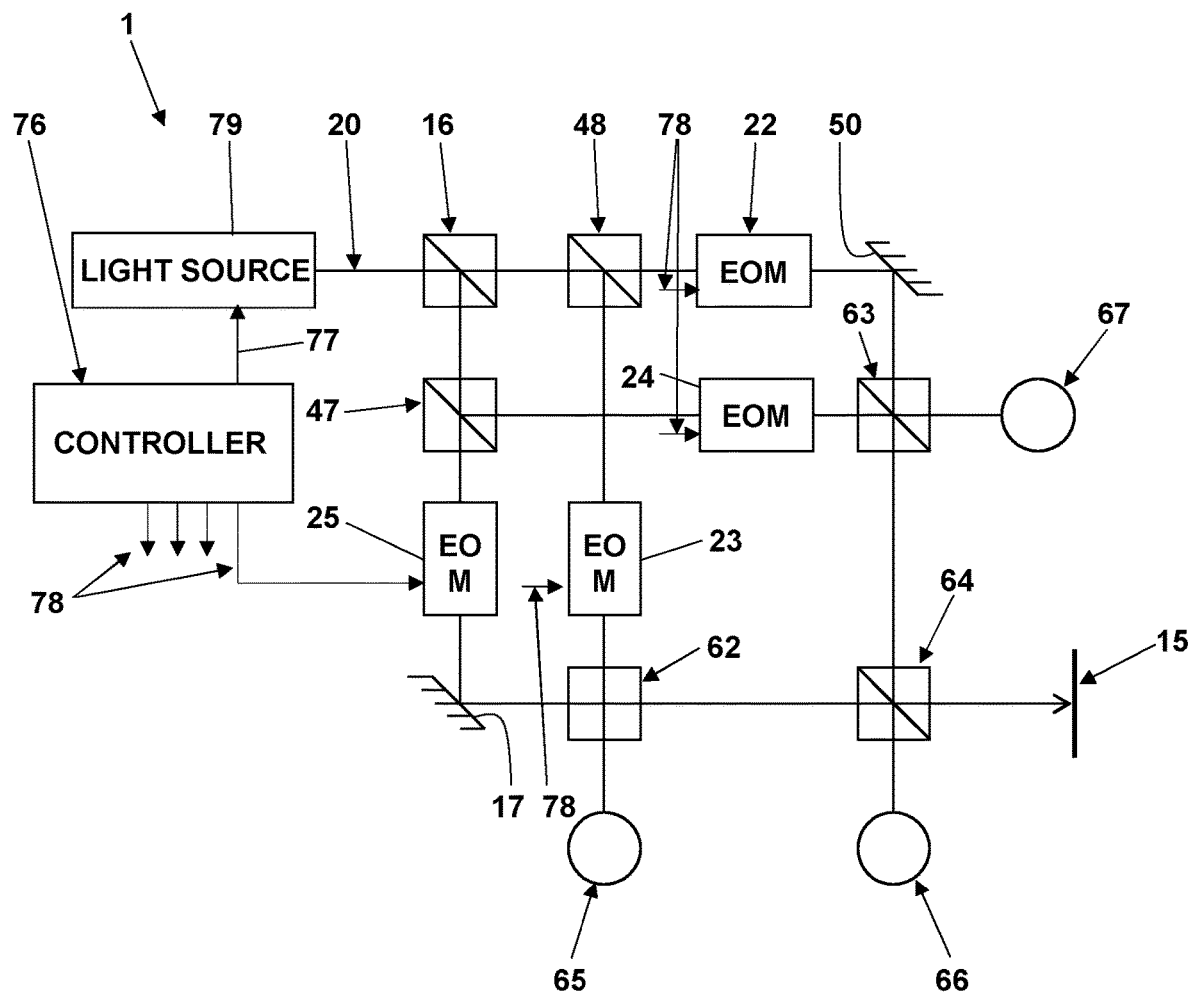
FIG. 7 schematically illustrates a variant of the embodiment of the apparatus of FIG. 6 and additionally depicts a controller of the apparatus.

FIG. 7 shows an embodiment of the apparatus 1 combining features of the embodiments of FIGS. 5 and 6. This embodiment comprises a minimum number of six 50/50 beam splitters 16, 47, 48, 62 to 64 and two full mirrors 17 and 50 to provide the same functions as the embodiment of FIG. 6 including the monitoring cameras 65 to 67. Further, FIG. 7 indicates that a controller 76 of the apparatus 1 may control a light source 79 by means of a control signal 77 such as to provide the beam 20 of collimated coherent light with a selected one of different wavelengths. By means of further control signals 78, the controller 76 controls the electro optical modulators 22 to 25 differently for the different wavelengths of the collimated coherent light of the beam 20.

Figure 8:
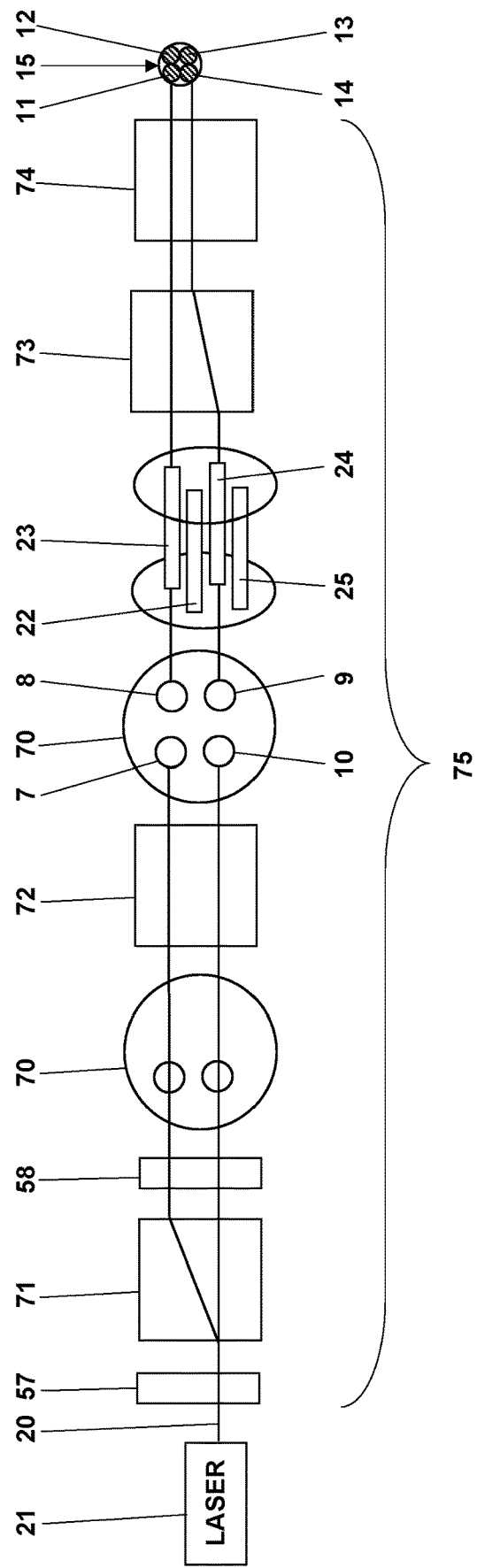
FIG. 8 depicts an even further embodiment of the apparatus for forming and shifting a light intensity distribution in a focal area of an objective lens, which may be made as a monolithic unit.

FIG. 8 shows an embodiment of the apparatus 1 in which the beam of coherent light 20 coming from the laser 21 is at first split-up by a birefringent beam displacer 71 in a first lateral direction and then by a second birefringent beam displacer 72 in a second lateral direction orthogonal to the first lateral direction. Beam cross sections 70 depicted in FIG. 8 are no parts of the apparatus but added to illustrate the effect of the beam displacers 71 to 74. The beam displacers 71 and 72 are combined with λ/2 waveplates 57 and 58 for defining the relative amplitudes of the four discrete portions of coherent input light 7 to 10 emerging out of the second birefringent beam displacer 72. The discrete portions 7 to 10 of the coherent input light are then modulated by the separate electro optical modulators 22 to 25 which are depicted in a perspective view here. Afterwards, the lateral distances of the discrete portions 7 to 10 required by the lateral distances of the electro optical modulators 22 to 25 are reduced by two further birefringent beam displacers 73 and 74 in the first and second orthogonal lateral directions. With their reduced lateral distances the discrete portions 7 to 10 of the coherent input light may be directly projected into the pupil 15 of the objective lens 5 which is not depicted here. Beam cross sections 70 depicted in FIG. 8 are no parts of the apparatus but added to illustrate the effects of the beam displacers 71 to 74. The optical elements arranged downstream of the laser 21 from the λ/2 waveplate 57 up to the birefringent beam displacer 74 may be combined into one monolithic unit 75 which needs no readjustment in the use of the apparatus 1. The beam displacers 71 and 72 used as beam splitters will differ from the beam displacers 73 and 74 used for reducing the lateral distances between the discrete portions 7 to 10 but not for completely merging these portions 7 to 10 of the coherent input light. All the beam displacers 71 to 74 may be made of a suitable optical material like calcite, quartz or the like. Instead of the beam displacers 71 to 74, pairs of Wollaston prisms may be used to achieve larger lateral distances or to reduce larger lateral distances between the discrete portions 7 to 10 of the coherent input light. Note that FIG. 8 shall be understood as a simplified schematic showing the principles and that further birefringent elements for polarization control may be included. These elements may be common for some beams or act on single beams. Further the lateral beam distances may also be reduced by other, non-birefringent optical elements such as tilted optical flats.

Figure 9:
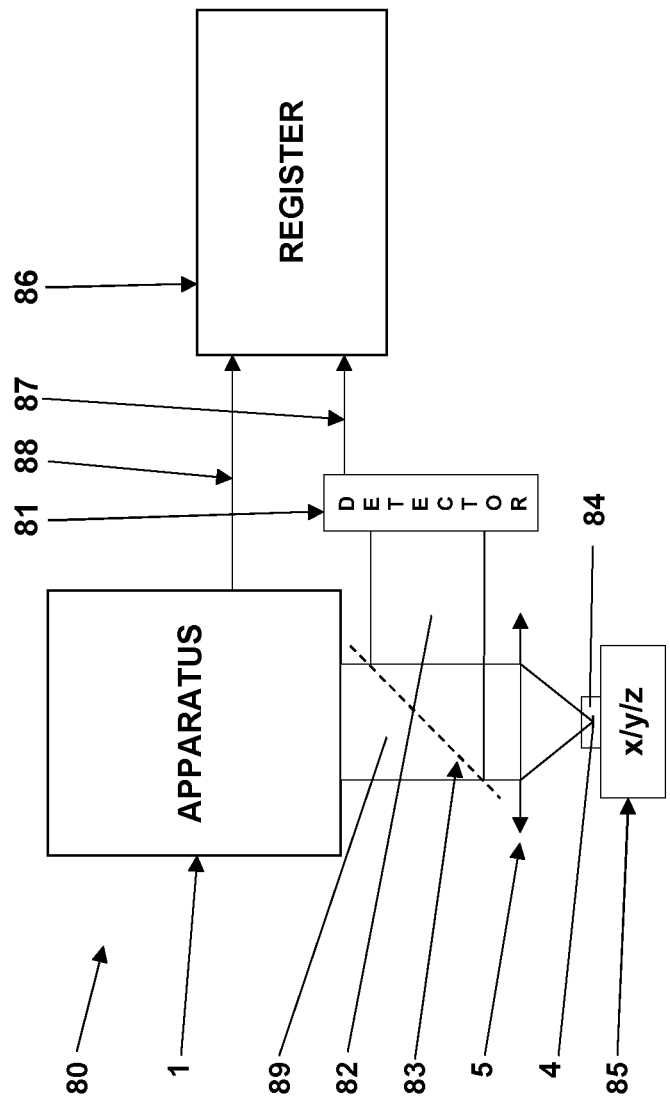
FIG. 9 schematically illustrates a microscope including an objective lens and the apparatus for forming and shifting a light intensity distribution in a focal area of the objective lens.

The microscope 80 schematically depicted in FIG. 9 comprises an apparatus 1 as described above, an objective lens 5 focusing the collimated input light 89 into the focal area 4 within a sample 84, and directing fluorescence light 82 emitted out of the focal area 84 via a dichroic mirror 83 separating the beam path of the fluorescence light 82 from the beam path of the input light 89 onto a detector 81. Although the detector 81 is depicted as being arranged in the collimated beam path of the fluorescence light 82 here, it will typically be arranged confocally with regard to the focal area 4. An output signal 87 of the detector 81 indicates the individual photons of the fluorescence light 82 detected by the detector 81 to a register 86. From the apparatus 1 the register 86 receives a position signal 88 indicating the present position of a central intensity minimum of the input light 89 in the focal area 84. In the register 86 such a position is registered for each photon of the fluorescence light 82 detected by the detector 81. The sample 84 is mounted on a sample stage 85 which may be shifted in all three dimensions x, y, and z for scanning the sample 84 with the focal area 4.

Many variations and modifications may be made to the preferred embodiments of the invention without departing substantially from the spirit and principles of the invention. All such modifications and variations are intended to be included herein within the scope of the present invention, as defined by the following claims.

We claim:

1. A method of forming and shifting a light intensity distribution in a focal area of an objective lens, the method comprising
    directing a plurality of portions of coherent input light one by one into a plurality of non-identical two-dimensional pupil areas of a pupil of the objective lens,
        wherein each of the plurality of portions of coherent input light is collimated in the pupil of the objective lens, and
        wherein the plurality of non-identical two-dimensional pupil areas include at least one pair of two two-dimensional pupil areas which are axially symmetrically arranged on opposite sides of an optical axis of the objective lens, and
    separately modulating at least one of the two discrete portions of coherent input light that are directed into the two two-dimensional pupil areas of the at least one pair with regard to its phase by means of an electro optical modulator such as to form the light intensity distribution in the focal area of the objective lens with a local intensity minimum delimited by intensity maxima and to shift the local intensity minimum in the focal area laterally with regard to the optical axis of the objective lens.

2. The method of claim 1, wherein the plurality of non-identical pupil areas include two pairs of two-dimensional pupil areas which are axially symmetrically arranged on opposite sides of the optical axis of the objective lens, wherein at least one of the two discrete portions of coherent input light directed into the two two-dimensional pupil areas of each of the two pairs is separately modulated by means of an individual electro optical modulator such as to form the light intensity distribution in the focal area of the objective lens with the local intensity minimum being enclosed by the intensity maxima.

3. The method of claim 2, wherein the at least one of the two discrete portions of coherent input light directed into the two two-dimensional pupil areas of each of the two pairs is separately modulated such as to move the local intensity minimum along a circle around the optical axis of the objective lens, wherein photons emitted by a single fluorophore molecule located in the focal area are detected, wherein for each photon detected an associated position of the local intensity minimum in the focal area is registered, and wherein an average position of the registered positions is calculated and taken as the position of the single fluorophore molecule in the focal area.

4. The method of claim 1, wherein the plurality of non-identical pupil areas include at least two pairs of two-dimensional pupil areas which are axially symmetrically arranged on opposite sides of the optical axis of the objective lens, wherein all the discrete portions of coherent input light that are directed into the two-dimensional pupil areas of the at least two pairs are separately modulated with regard to their amplitudes by means of electro optical modulators.

5. The method of claim 1, wherein the two-dimensional pupil areas of the plurality of non-identical two-dimensional pupil areas are uniformly distributed around the optical axis of the objective lens, wherein, with n two-dimensional pupil areas of the plurality of non-identical two-dimensional pupil areas, a basic phase offset between two discrete portions of coherent input light directed into two neighboring two-dimensional pupil areas of the plurality of non-identical two-dimensional pupil areas is 360°/n or 720°/n or 0°.

6. The method of claim 1, wherein a fraction of each discrete portion of the plurality of portions of coherent input light is coupled out and projected onto a monitoring camera for monitoring the positions of the individual discrete portions of the plurality of portions of coherent input light in the pupil of the objective lens.

7. The method of claim 1 comprising also separately modulating the at least one of the two discrete portions of coherent input light that are directed into the two two-dimensional pupil areas of the at least one pair with regard to its phase by means the electro optical modulator such as to alternately provide for first basic phase offsets and second basic phase offsets between the two discrete portions of coherent input light, wherein the first basic offsets differ from the second basic offsets.

8. The method of claim 1 comprising alternately providing the plurality of the discrete portions of coherent input light with a first wavelength and with a second wavelength of the coherent input light, wherein the second wavelength differs from the first wavelength, and differently separately modulating the at least one of the two discrete portions of coherent input light that are directed into the two two-dimensional pupil areas of the at least one pair with the first wavelength and with the second wavelength of the coherent input light.

9. The method of claim 1, wherein the at least one of the two discrete portions of coherent input light that are directed into the two two-dimensional pupil areas of the at least one pair is further separately modulated to compensate for aberrations of the plurality of portions of coherent input light caused by the objective lens or any other optics.

10. The method of claim 1, wherein the light intensity distribution is superimposed with at least one further light intensity distribution of light incoherent with regard to the coherent input light of the light intensity distribution, wherein the at least one further light intensity distribution is a static light intensity distribution including a central intensity maximum or a central intensity minimum between two intensity maxima following to each other along the optical axis of the objective lens.

11. An apparatus for forming and shifting a light intensity distribution in a focal area of an objective lens, the apparatus comprising
optics configured for directing a plurality of portions of coherent input light one by one into a plurality of non-identical two-dimensional pupil areas of a pupil of the objective lens,
wherein each of the plurality of portions of coherent input light is collimated in the pupil of the objective lens, and
wherein the plurality of non-identical two-dimensional pupil areas includes at least one pair of two two-dimensional pupil areas which are axially symmetrically arranged on opposite sides of an optical axis of the objective lens, and
a modulator equipment including at least one electro optical modulator comprising a phase modulator configured and arranged for separately modulating at least one of the two discrete portions of coherent input light that are directed into the two two-dimensional pupil areas of the at least one pair with regard to its phase such as to form the light intensity distribution in the focal area of the objective lens with a local intensity minimum delimited by intensity maxima and to shift the local intensity minimum in the focal area laterally with regard to the optical axis of the objective lens.

12. The apparatus of claim 11, wherein the optics are configured for directing the portions of the plurality of portions of coherent input light into the two-dimensional pupil areas such that the portions are uniformly distributed around the optical axis of the objective lens.

13. The apparatus of claim 11, wherein the modulator equipment includes one electro optical modulator for each discrete portion of the plurality of portions of coherent input light which comprises a phase modulator configured and arranged for independently separately modulating the phase of the respective discrete portion of the plurality of portions of coherent input light.

14. The apparatus of claim 11, wherein the at least one electro optical modulator further comprises an amplitude modulator.

15. The apparatus of claim 11 comprising a plurality of optical fibers, wherein each fiber of the plurality of optical fibers is configured and arranged for guiding one discrete portion of the plurality of portions of coherent input light, and a projection optic configured and arranged for collimating and projecting the discrete portions of the plurality of portions of coherent input light getting out of the ends of the fibers of the plurality of optical fibers into the pupil of the objective lens, wherein the separate electro optical modulators are integrated optical light modulators integrated into optical fibers each configured for guiding one portion of the plurality of portions of coherent input light.

16. The apparatus of claim 11, wherein the at least one electro optical modulator are selected from Pockels-cells and Kerr-cells.

17. The apparatus of the claim 11 comprising a beam splitting device configured and arranged for splitting a beam of coherent light to provide the discrete portions of coherent input light, the beam splitting device including at least one optical element selected from
polarizing and non-polarizing beam splitter cubes and plates,
birefringent beam splitters and beam displacers,
Wollaston prisms and
fiber optical beam splitters.

18. The apparatus of claim 17, wherein the beam splitting device, the modulator equipment and at least one part of the optics are integrated in a monolithic optical unit.

19. The apparatus of claim 11 comprising a monitoring equipment including a monitoring camera and configured and arranged for coupling out and projecting a fraction of each discrete portion of the plurality of portions of coherent input light onto the monitoring camera arranged for monitoring the positions of the individual discrete portions of the plurality of portions of coherent input light in the pupil of the objective lens.

20. The apparatus of claim 11 comprising a light source configured to alternately provide the plurality of the discrete portions of coherent input light with a first wavelength and with a second wavelength of the coherent input light, wherein the second wavelength differs from the first wavelength, and a controller configured to control the separate electro optical modulator to differently separately modulate the at least one discrete portion of the plurality of portions of coherent input light with the first wavelength and with the second wavelength of the coherent input light.

21. A microscope comprising an objective lens, an apparatus of claim 11, a detector configured and arranged for detecting photons emitted out of the focal area, and a register configured for registering an associated position of the local intensity minimum in the focal area for each photon detected.

* * * * *